(12) United States Patent
Peters et al.

(10) Patent No.: US 11,889,848 B2
(45) Date of Patent: Feb. 6, 2024

(54) CONFECTIONERY PRODUCTION

(71) Applicant: MARS, INCORPORATED, McLean, VA (US)

(72) Inventors: Jasper Theodoor Peters, Veghel (NL); Theodor Anton Hermanus Johannes Prinsen, Veghel (NL)

(73) Assignee: MARS, INCORPORATED, McLean, VA (US)

( * ) Notice: Subject to any disclaimer, the term of this patent is extended or adjusted under 35 U.S.C. 154(b) by 239 days.

(21) Appl. No.: 16/371,335

(22) Filed: Apr. 1, 2019

(65) Prior Publication Data

US 2019/0289873 A1   Sep. 26, 2019

Related U.S. Application Data

(63) Continuation of application No. 15/518,369, filed as application No. PCT/US2015/055531 on Oct. 14, 2015, now abandoned.

(30) Foreign Application Priority Data

Oct. 17, 2014  (GB) ..................................... 1418422

(51) Int. Cl.
*A23G 3/52* (2006.01)
*A23G 3/44* (2006.01)
*A23G 3/48* (2006.01)

(52) U.S. Cl.
CPC ................ *A23G 3/52* (2013.01); *A23G 3/44* (2013.01); *A23G 3/48* (2013.01); *A23V 2002/00* (2013.01)

(58) Field of Classification Search
CPC .................................... A23G 3/52; A23G 3/44
See application file for complete search history.

(56) References Cited

U.S. PATENT DOCUMENTS

| | | | |
|---|---|---|---|
| 3,520,698 A | 7/1970 | Szafranski | |
| 3,586,513 A | 6/1971 | Horn et al. | |
| 4,545,989 A * | 10/1985 | Becker | A23G 3/36 424/682 |
| 4,911,937 A | 3/1990 | Crosello et al. | |
| 5,529,800 A | 6/1996 | Bourns | |
| 5,942,275 A * | 8/1999 | Wong | A23L 25/10 426/631 |
| 8,475,863 B2 | 7/2013 | Perry et al. | |
| 2010/0330247 A1 | 12/2010 | Montaigne et al. | |
| 2014/0193545 A1 | 7/2014 | Rodrigues et al. | |
| 2017/0245519 A1 | 8/2017 | Peters et al. | |
| 2019/0289873 A1 | 9/2019 | Peters et al. | |

FOREIGN PATENT DOCUMENTS

| | | | |
|---|---|---|---|
| EP | 0513462 | | 1/1992 |
| EP | 1216621 | | 6/2002 |
| EP | 3206505 A1 | | 8/2017 |
| FR | 2852607 | | 9/2004 |
| GB | 1003156 | | 9/1965 |
| GB | 1072016 | | 6/1967 |
| GB | 1274356 | * | 5/1972 |
| WO | WO 9421826 | | 9/1994 |
| WO | WO 0028833 | | 5/2000 |
| WO | WO 2000053024 | | 9/2000 |
| WO | WO 0105256 | | 1/2001 |
| WO | WO 2003103410 | | 12/2003 |
| WO | 2008117066 A1 | | 10/2008 |

OTHER PUBLICATIONS

Lees et al. "Sugar Confectionery and Chocolate Manufacture" Chapman and Hall 1973 pp. 300 and 316 (Year: 1973).*
Ehrenhauser, et al "Size Matters: Crystal Size Analysis for the Lousiana Sugar Industry" https://www.lsuagcenter.com/profiles/lbenedict/articles/page1491324916020 Apr. 2017 pp. 1-8.*
NordicSugar "Icing Sugar" May 12, 2013 pp. 1-2 https://www.nordicsugar.com/fileadmin/Nordic_Sugar/Brochures_factsheet_policies_news/Download_center/Industry_product_data_sheet/English/icing_sugar.pdf (Year: 2013).*
O'Hagen, Patrick (ed) "Why Measure Particle Size" Natural Products Insider Jun. 2004 pp. 1-3 https://www.naturalproductsinsider.com/labstesting/food-product-design-new-technologies-june-2004-why-measure-particle-size (Year: 2004).*
Manley, D. "Biscuit, Cookie and Cracker Manufacturing: Manual 1—Ingredients" Woodhead Publishing 1998 p. 33 (Year: 1998).*
Velie, Marissa "The Serious Eats Guide to Sugar" May 16, 2014 pp. 1-20 https://www.seriouseats.com/2014/05/the-serious-eats-guide-to-sugar-syrup-honey-natural-sweetners.html#superfine-sugar (Year: 2014).*
British Sugar "Speciality Crystalline White Sugars" pp. May 1-4, 2015 https://www.britishsugar.co.uk/perch/resources/speciality-crystalline-white-suagrs.pdf (Year: 2015).*
Joshua. "Difference Between Icing Sugar and Powdered Sugar." DifferenceBetween.net. Jun. 20, 2017 pp. 1-4http://www.differencebetween.net/object/comparisons-of-food-items/difference-between-icing-sugar-and-powdered-sugar/ (Year: 2017).*
"Sugar Confectionary Manufacture", Berlin:Springer, Second Edition, Ed. E.B. Jackson, Chapter 15, Marshmallow and Nougat, 299-323, 1973.
EP Office Action in Application No. 15787368.8, dated Jan. 17, 2020, 7 pages.
Beckett, "Industrial Chocolate Manufacture and Use," 4th Ed., Wiley-Blackwell, 2009, pp. 48-51.
Campbell et al., "Creation and characterisation of aerated food products," Trends in Food Science & Technology, 1999, 10(9):283-296.
Edwards, "The Science of Sugar Confectionery," 1st ed., Royal Society of Chemistry, Dec. 2000, pp. 23-24.

(Continued)

*Primary Examiner* — Jyoti Chawla

(57) ABSTRACT

The invention provides a sugar composition for use in the manufacture of foodstuffs, said composition comprising a suspension of a fine sugar having a mean particle size of less than 30 microns in glucose syrup. This composition allows for energy efficient production of products including frappe, and methods as well as apparatus used in these methods form further aspects of the invention.

17 Claims, 2 Drawing Sheets

(56) References Cited

OTHER PUBLICATIONS

Figure 1:
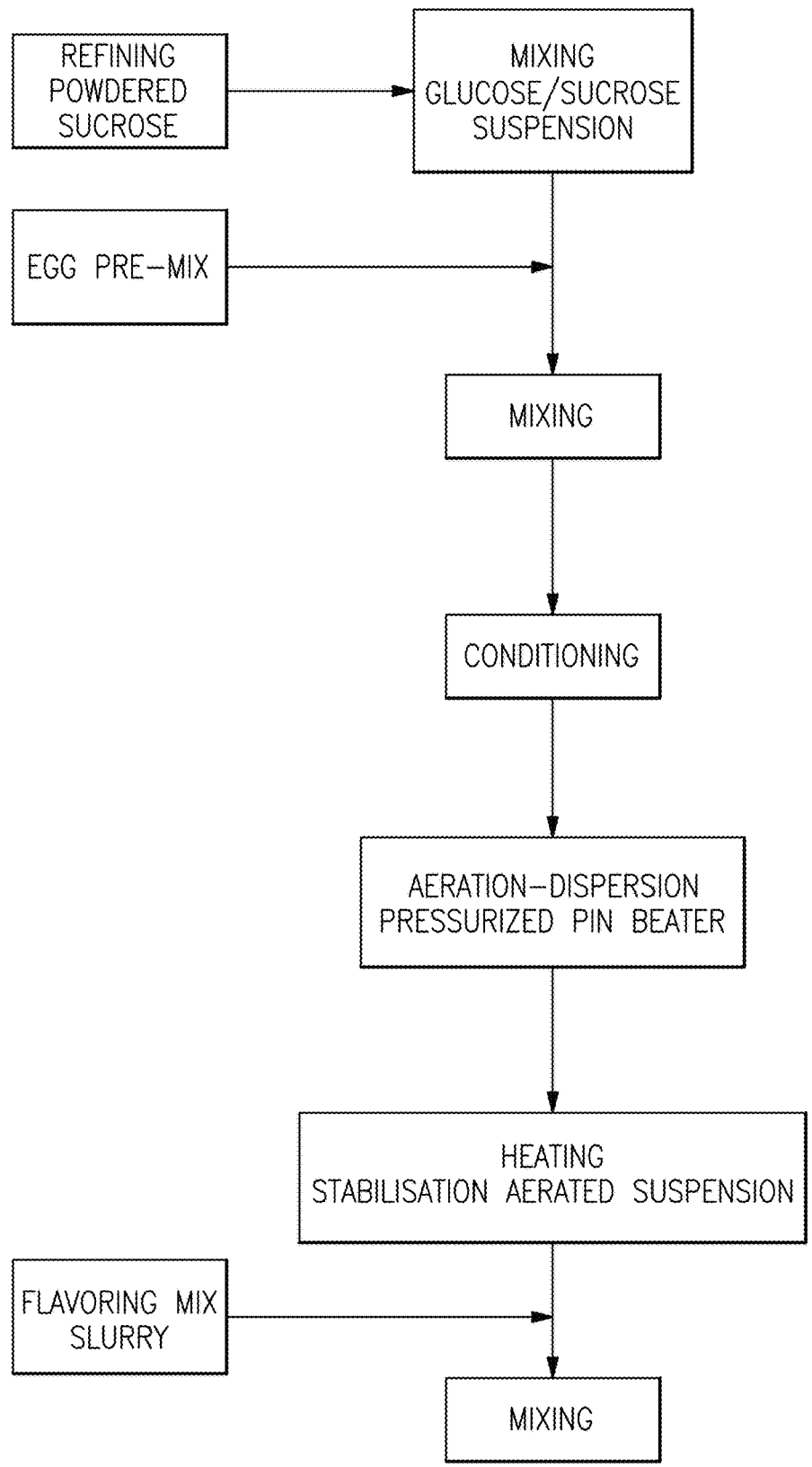

Hull, "Glucose Syrups: Technology and Applications," 1st ed., Wiley-Blackwell, Mar. 2010, pp. 19-20, 125-126, and 149-173.
Kissell et al., "Effect of Variability in Sugar Granulation on the Evaluation of Flour Cookie Quality," Cereal Chemistry, 1973, 50:255-264.
Lees et al., "Sugar Confectionery and Chocolate Manufacture," 1st ed., Blackie Academic & Professional, 1973, pp. 90-91, 171-172, 299-323, and 332-336.
Minifie, "Chocolate, Cocoa, and Confectionery: Science and Technology," 3rd ed., AVI, Van Nostrand Reinhold, 1989, pp. 514-517, 567-573, 592-593, 603.
Pennington et al., "Sugar: A User's Guide to Sucrose," 1st ed., AVI, Van Nostrand Reinhold, 1990, pp. 22-23 and 110.
Sumnu et al., "Food Engineering Aspects of Baking Sweet Goods," 1st ed., CRC Press, Taylor & Francis Group, 2008, p. 155.
Frank Urban and Philip A. Shaffer, The Acidic Property of Sugars, 1932, p. 697-715, vol. 94, Issue 3, Laboratory of Biological Chemistry, Washington University School of Medicine, St. Louis.
Malerz et al., Following in Emil Fischer's Footsteps: A Site-Selective Probe of Glucose Acid-Base Chemistry, 2021, p. 6881-6892, 125, Journal of Physical Chemistry.

* cited by examiner

CONFECTIONERY PRODUCTION

The present invention relates to a sugar composition useful in the production of confectionery products, in particular a nougat product, to processes for preparing the composition as well as its use in processes for manufacturing food products, to products obtained thereby and apparatus used in the manufacturing processes.

BACKGROUND TO THE INVENTION

Sugar syrups are used in the product on of a wide range of processed foodstuffs and in particular confectionery items such as nougat.

Nougat is a particularly popular confectionery item. It may be available as a discrete product in itself. Alternatively, it is present as a component of composite confectionery items such as bars which comprise other elements such as chocolate, as well as caramels including aerated caramels, toffees, fudges, nuts, wafers, biscuits, gels, flavoured creams or pralines.

Nougats traditionally comprise sugars which may be in the form of honey as well as egg white, which provides a source of protein. Some nougats are hard and chewy but softer nougats, sometimes called nougatines, contain higher moisture content. They may contain ingredients such as cocoa, milk powder, lactose, malt and icing sugar, which have a shortening effect. Fat and emulsifiers may also be included.

Typical nougat recipes are described for example in Sugar Confectionery Manufacture (Berlin:Springer) Second edition, 1995 Ed. E. B. Jackson and in particular in Table 13.3 which shows some specific examples. Typically, nougat formulations comprise from 60-82% w/w for example from 67-80% w/w of a sugar syrup, 6-32% for example from 8-25% w/w of an egg mixture and from 5-15% for example from 10-14% w/w of a flavouring and graining mixture.

In some cases nuts and dried fruit are added to nougat to produce a product called montelimart.

Nougat is typically prepared by mixing together appropriate amounts of a sugar syrup and a protein mixture, aerating the mixture and thereafter mixing the resultant frappe with a suitable quantity of flavouring/graining mixture. Thus as used herein, the term 'frappe' refers to an aerated or foamed mixture comprising sugars and proteins which has been stabilised by coagulation of the proteins. This is used as a starting material for a range of products including nougat but also meringue, fondant, cake, bavaroise or mousse.

Typically, frappe is prepared using a syrup solution prepared by mixing a sugar such as granulated sucrose with sufficient water to form a solution, which sugar solution is formed into a 'base syrup' or 'doctor syrup' by addition of glucose and optionally other ingredients such as salt. It is then generally necessary to subject the base syrup to a heating or cooking procedure to remove at least some of the water before the syrup is of an appropriate concentration to go forward to the subsequent processing stages.

Highly elevated temperatures for example of up to 140° C. are generally required in order to evaporate water so as to reduce the water content in line with the recipe. On cooling, the resultant syrup forms a highly saturated solution which changes state during production to a crystalline form to obtain the desired texture properties. Residual energy may be used subsequently to assist in coagulating protein. However, overall, this process requires considerable energy expenditure.

The applicants have found an alternative, energy efficient means of introducing sugars into food products, in particular confectionery such as nougat.

SUMMARY OF THE INVENTION

According to the present invention, there is provided a composition for use in the manufacture of foodstuffs, said composition comprising a suspension of a fine sugar having a mean particle size of less than 30 microns in glucose syrup.

The applicants have surprisingly found that the use of suspensions of fine sugar can be used as a substitute for sugar solutions or syrups, without causing undue 'graininess' or 'sandiness' in the final product. However, by using this product, there is no need to include the relatively large amounts of water necessary to create a sugar solution, and which may have to be removed later during the processing. This results in significant energy savings in the processing. Furthermore, the use of a sugar suspension of the invention may simplify the production process in other ways, since the handling of a sugar suspension at moderate temperatures may be easier than dealing with sugar solutions and the high temperatures to which they are required to be exposed in order to produce acceptable products.

As used herein, the expression 'for use in manufacture' generally means that the composition is suitable for use on a production manufacturing scale. Thus for example, the composition will comprise significant quantities, for example in excess of 10 kg/hour, for example from 60 kg/hour to 2000 kg/hour.

Suitably the fine sugar is a refined or milled sucrose. In particular, the fine sugar has a mean particle size of less than 25 microns, for example less than 20 microns, in particular less than 15 microns. Thus for example, the fine sugar has a mean particle size in the range of from 5-30 microns, for example in the range of from 10-30 microns. Whilst the mean particle sizes are in the ranges given above, the maximum particle size is suitably no more than 35 microns, and in particular no more than 30 microns.

Such sugars are available commercially where they may be sold as 'icing sugars'. Alternatively, they may be produced by grinding or milling granulated sugars.

Glucose syrups are well known in the art and are obtained by hydrolysis of starches, generally vegetable starches. They may have a variable composition but are generally classified on the basis of their dextrose equivalence (DE) value. Generally, the higher the dextrose equivalence, the lower the viscosity of the syrup is, although temperature also plays a key role in the viscosity. In order to form a suspension, the viscosity of the glucose syrup is suitably in the range of from 6 Pa·s/60° C. to 1.5 Pa·s/60° C. This may be achieved with a range of glucose syrups by adjusting the temperature accordingly. However, in order to ensure that a suspension, in particular a uniform suspension, may be formed within a reasonable temperature range, the glucose syrup used in the composition of the invention suitably has a DE value in the range of from 35-95, for example from 45-80 such as from 55-70, for instance about 62.

The ratio of glucose syrup to fine sugar in the composition of the invention will vary depending upon the product to which the composition is required to be added. Typically however, it will be in the range of from 3:1 to 1:3, for example in the range of from 2:1 to 1:2, such as from 1:1 to 1:1.5 based upon dry weights. The composition may be formed by mixing the fine sugar with glucose syrup at a suitable temperature in order to form the composition. Typically, the temperatures will be in the range of from 35 to 65° C. to ensure that a substantially homogenous or uniform suspension is formed, but this will depend upon the viscosity of the particular glucose syrup and the particle size of the fine sugar used. Such a method forms a further aspect of the invention.

In a particular embodiment, the suspension is formed in a two-step process, in which in a first step, the fine sugar is mixed with the glucose syrup at a moderate temperature, for example in the range of from 35-45° C., and the pre-mix is then, in a second step, heated or warmed to facilitate blending, for example at temperatures in the range of from 55-65° C. These two steps may be carried out sequentially or simultaneously, for example in a single heated mixer The composition may then be used in a further process to form a foodstuff and in particular a confectionery item.

Thus, a further aspect of the invention provides the use of a composition comprising a suspension of a fine sugar having a mean particle size of less than 30 microns in glucose syrup, in the production of a processed foodstuff such as a confectionery item.

Particular confectionery items that may be prepared using the composition of the invention include frappes. These may then be used to produce other products such as nougats, meringue, fondants, cakes, bavaroise and mousses.

In yet a further aspect the invention provides a method for producing frappe, said method comprising mixing a composition as described above and a formulation comprising a protein under conditions in which frappe is formed.

Suitably the mixing process is carried out at a moderately elevated temperature, so as to ensure that the viscosity of the suspension is sufficiently high to allow intimate mixing to occur. However, the temperature is suitably below that at which the proteins coagulate, so as to maintain protein functionality through mixing. Thus in particular, the mixture is carried out at temperatures below 65° C., for example in the range of from 55-65° C.

A suitable protein formulation is a mixture which comprises powdered egg, milk protein or a mixture thereof. In particular the protein formulation may comprise egg syrup. The protein formulation is suitably added to the composition of the invention in an amount of from 2-20% w/w, for example from 5 15% w/w.

The protein formulation may further comprise other agents or ingredients as required including sugar such glucose, which may be in the form of the base or doctor syrup, but also salt, hydrocolloids, gums and raising agents as necessary. For example, a typical egg syrup will contain components such as glucose syrup and water as well as egg powders in particular egg albumen powders. Further additives may include whipping or setting agents, flavouring agents or salt.

Water is added at this stage in order to provide the required moisture level in the final product. The amount of water added will vary depending in particular on the nature of the final product but for a confectionery product, will typically be in the range of from 5-20% w/w for example from about 10-15% w/w. In a particular embodiment, the water is mixed with the protein formulation as described above. It may be introduced in a homogenisation and hydration step before the protein formulation is mixed with the sugar suspension.

The resultant mixture may be subject to further processing as required at this stage. In particular, it is aerated using conventional methods, in particular after conditioning to ensure that the temperature of the mixture is such as to produce the required viscosity for aeration.

In a particular embodiment, aeration is effected in a pressurised system using a pressure beater. Such devices generally comprise a stator and rotor, which may be provided with pins, forming a 'pin beater'. In this arrangement, the mixture is mixed in a container into which pressurised air is fed. The pressure of air applied during frappe make up will depend upon factors such as the consistency of the medium (comprising sugars and protein) to be aerated, and the parameters of the pressurised system, for example, the degree of back pressure delivered into the pressure device by a downstream pressure valve, but will typically be in the range of from 3-5 bar (43.51-72.52 psi). Suitable mixing speeds will be in the range of 300-1200 rpm. The temperature at which the aeration is carried out is selected so as to ensure that the viscosity of the mixture is suitable to allow it to be beaten and for air bubbles to be entrapped and dispersed within it and hold the air bubbles within it. It may be in the range of from 55-110° C. although at the higher levels, proteins may coagulate. If this is not required, then the temperatures may be kept below 65° C.

The degree of aeration produced in the mixture depends upon the amount of air injected into the pressurised system.

The mixture is suitably heated, preferably in a subsequent step, so as to coagulate at least some of the proteins present to stabilise the final frappe product.

The temperatures used at this time will depend upon factors such as the precise nature of the protein mixture and the desired consistency for the frappe. Typically however, the temperatures used at this stage will be in the range of from 65-100° C. In particular however, the temperatures used will be in the range of from 85-95° C.

The temperature is suitably achieved by heating the mixture with stirring, using conventional heating methods and equipment. In particular, heat is applied using efficient direct heating equipment which may be applied to the mixture in the production line, continuous process. The amount of heat required to achieve this will be dependent upon factors such as, in the case of a continuous process, the mass flow, the residence time with the heating unit, and the density and conductivity of the frappe as well as the energy efficiency of the equipment. In the case of the conductivity of the frappe, this will be affected by the composition (e.g. fat and water content, the fluid viscosity, whether or not it contains any solid pieces, and the specific heat of the components.

The heat administered should be sufficient to coagulate the proteins present in order to stabilise the product, but there is no need to heat in order to evaporate moisture from the product. Thus the process is efficient.

During this heating step, some of the finer sugar particles will be dissolved in the matrix so that the saturation level increases. In addition, some of the larger sugar particles may partially dissolve, further increasing the saturation level.

However, at least some sugar particles will remain as discrete particles and nucleate crystallisation during the subsequent conditioning processes.

Once this heating is complete, the product exits the pressurised system whereupon it expands as a result of the incorporated air, which reduces the density, to form a frappe, having a characteristic white colour and visco-elastic properties. Expansion results in partial cooling which is suitably controlled to 80-90° C. to enable shaping of the resulting frappe. The cooling results in a highly saturated sugar suspension in the product.

Other components may be may be mixed with the frappe, or even with the mixture before aeration if required. Suitable other components may comprise a flavouring/graining mixture, such as is used to flavour commercial nougat products. The flavouring/graining mixture will vary depending upon the particular recipe being produced but may contain for example fat such as vegetable fat in an amount of from 33-50% w/w for example from 30-35% w/w and colouring or flavouring such as milk powder or lactose in an amount of from 20-50% w/w such as from 20-25% w/w. In some cases, this mixture may further comprise additional components to produce a flavouring or taste effect such as cocoa powder, typically in an amount of from 14-35% w/w such as from 25-33% w/w.

The fine sugar already present may function as nuclei for crystallisation and so there is no need to add further nucleation agents such as icing sugar at this time. This is advantageous in that it produces raw material cost savings as there is no need for seeding crystals. Furthermore, there may be reductions in asset costs because there is no need to provide a mixer, specifically to blend seeding crystals into the frappe. This may be particularly useful in processing plain nougat textures.

As described above, although it may be expected that the presence of fine sugar particles in the product may affect the graininess or roughness of the product as well as the perceived density then tasted, the applicants have found that, generally, this is not the case. The size of the particles in the suspension should be small enough to ensure that the product does not have an undesirable graininess or roughness. In some instances, in particular where the product has an inherently uneven texture, such as products containing solid particles such as nuts or biscuit particles, the size of the fine sugar used in the suspension may be at the upper end of the ranges used, whereas where the product is of a smooth texture, smaller fine sugar particles may be preferred.

Frappes and nougats obtainable in this manner and confectionery products containing them form a further aspect of the invention.

The methods described above are suitably carried out in an 'in-line' production procedure using apparatus designed to effect the process.

The apparatus used to carry out the method may also be novel and novel apparatus forms a further aspect of the invention. In particular, the apparatus comprises a container, mixing means for mixing material in the container, means for delivering fine sugar powder to the container, means for delivering glucose syrup to the container and control means to control the relative amounts of fine sugar powder and glucose syrup which is delivered to the container.

The container is suitably an elongate container. The mixing means are suitably a series of rotating blades arranged in the container such that material added to an end region of the container is transported along it while being mixed. The means for delivering fine sugar powder suitably comprises a pipe or tube, connected to a storage device such as a hopper for fine sugar. Similarly, the means for delivering glucose syrup suitably comprises a pipe or tube, connected to a storage device such as a tank for glucose syrup. The control means those known in the art and will be set to ensure that the desired ratio of fine sugar to glucose syrup as described above is delivered to the container.

In a particular embodiment, heating means are provided for the elongate container, suitably downstream of the means for delivering fine sugar powder and the means for delivering glucose syrup, arranged to heat the contents of the container to a suitable temperature to allow a suspension of the sugar powder to form in the glucose syrup as described above. Control means to maintain such temperatures may be provided.

In a particular embodiment, the apparatus comprises additional delivery means, arranged to provide further formulations, compositions or ingredients to the suspension of fine sugar in glucose syrup as soon as it has been formed in the mixer. In particular, the apparatus comprises means for delivering a protein formulation such as an egg syrup as described above, to the suspension of fine sugar in glucose syrup once it has been formed.

Heating means, arranged to condition the resultant mixture by producing temperatures for example in the range of from 45 to 65° C. allows the viscosity of medium to be controlled making it suitable for aeration without causing coagulation of proteins.

In a particular embodiment, the apparatus further comprises an aeration device such as a pressurised pin beater, which is arranged to receive material from the mixing container. The pin beater is arranged to aerate the product so as to allow frappe to form as described above.

The apparatus may further comprise additional heaters, arranged to further heat the aerated material so as to coagulate proteins and stabilise the resultant frappe.

This may then be used to form a range of confectionery products including nougat using known methods.

In summary, the invention provides a convenient and energy efficient means for producing foodstuffs, in particular frappes and nougats used in the confectionery industry. By using a sugar suspension instead of concentrated sugar syrup, there may be significant energy savings since the high temperatures required to form a highly saturated sugar solution (120-140° C.) can be avoided. This means also that risks associated with the use of such high temperature sugar solutions, such as the formation of glasses, which can block or clog a processing line is avoided.

In addition, the equipment required may be simpler than conventional nougat processing equipment and thus may represent an asset cost reduction. In particular, there is no need to provide a frappe cooler which may otherwise be required to ensure that frappe is cooled to temperature below that at which the seed crystals are destroyed.

Furthermore, the avoidance of such high temperature procedures may allow further rationalisation of the process so that procedures such as aeration, required to be carried out before protein coagulation, may be carried out after the formation of the frappe rather than before since heat transfer from a high temperature sugar syrup that may cause premature protein coagulation is avoided.

Since only the pressurized mixture of egg, saturated sugar suspension and air is required to be subjected to high temperatures required to coagulate the proteins, efficient heating apparatus such as Direct Electric resistance heating (0) units may be used. Such heaters allow high temperatures to be reached rapidly and with great controllability allowing processes to be started and stopped quickly as required. They do not produce hot surfaces and thus there is less risk of accidentally burning the product. Furthermore, they provide high energy conversion efficiency, (of the order of 95%) and require relatively low capital cost as compared to say, microwave heaters.

Figure 2A:
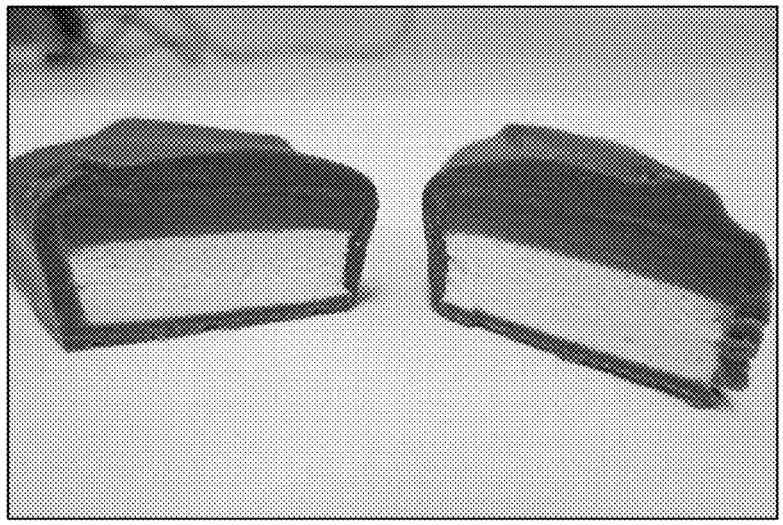
Figure 2B:
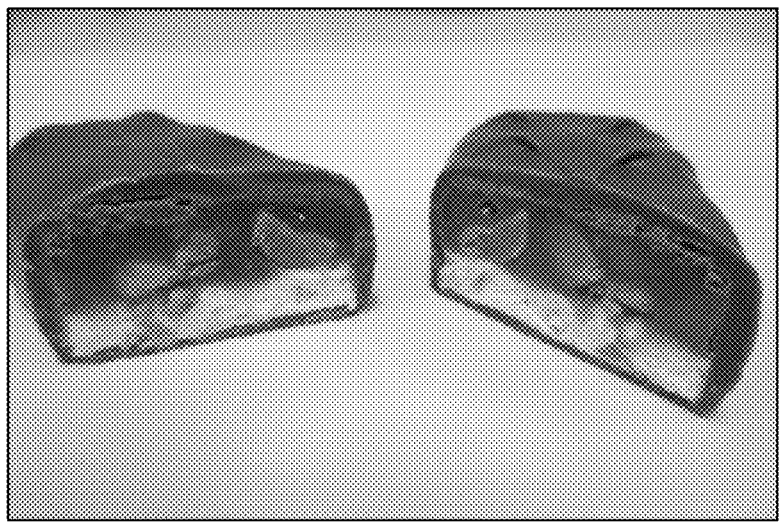

The invention will now be particularly described by way of example with reference to the accompanying diagrammatic drawings in which:

FIG. 1 is a schematic diagram illustrating the process of the invention when used for the production of a confectionery product; and FIG. 2A and FIG. 2B illustrate confectionery products including nougat produced using the composition of the invention.

EXAMPLE 1

Production of Nougat-Type Product

Nougat type products were produced in a laboratory using the scheme illustrated in FIG. 1.

A base or doctor syrup was prepared using the following components:

| | |
|---|---|
| Fine sucrose | 664 g |
| Glucose syrup | 900 g |
| Salt | 6 g |

Various grades of fine sugar (sucrose) (standard grade having an average particle size in the range of from 20-30 microns, and super fine grade having an average particle size in the range of from 10-15 microns) can be used to prepare alternative doctor syrups. The components were mixed in a mixer at a temperature held in the range of from 40-45° C. until an even suspension was produced.

A hydrated egg syrup may also be prepared from the following ingredients:

| | |
|---|---|
| Egg albumen | 28 g |
| Water | 52 g |
| Glucose | 78 g |
| Fine sucrose | 62 g |

The temperature of the egg syrup at this time is in the range of 15-20° C.

The hydrated egg syrup is then mixed with the sugar suspension. After a period of conditioning to produce the required product viscosity, during which the mixture was heated to temperatures in excess of 55° C. but less than 65° C. so not to denature proteins present, the mixture was subject to an aeration process.

In this process, the mixture is introduced into a pressurized pin beater at a temperature of 55° C. In essence, the mixture in beaten with a rotary beater, turning at 710 r.p.m in an air pressure of 4.2 bar.

The resultant aerated mixture is then heated at a temperature greater than 93° C. so as to denature the proteins and so stablise the final frappe.

As the product exits the pressurized pin beater, the incorporated air expands as a result in the reduction in pressure, causing the density of the product to decrease and an open aerated frappe to form.

A flavouring mix or slurry may also be prepared from the following ingredients:

| | |
|---|---|
| Cocoa powder | 34 g |
| milk powder | 108 g |
| Fat | |

The slurry (176 g) is mixed with the frappe (1790) to produce a nougat type product.

Products obtained in way resemble a conventional nougat in appearance and texture.

EXAMPLE 2

Sensory Test

Nougats similar to those obtained in Example 1 were formulated into two different conventional confectionery product bars by addition of additional ingredients including caramel layers, biscuit layers, nuts and chocolate layers. Product 1, contained chopped nuts and was produced using the nougat obtained using standard grade icing sugar and Product 2 was produced using the nougat obtained using the superfine grade of icing sugar so as to most closely resemble the conventional confectionery product bars produced in the factory. In appearance, they resembled the conventional product (FIG. 2).

The bars were aged for a period of 6, 12 or 18 weeks, after which a series of taste tests were carried out to determine whether the different source of nougat impacted in particular on the roughness of the product. Panels of from 12 or 15 individuals were asked to taste the similar product bars as prepared using a conventional factory produced nougat and those produced using the nougat of Example 1 and comment on the differences in texture.

The results are summarized in the following table:

| Aging (weeks) | Mean Particle size | No of panelists who mentioned presence of sugar crystals | |
|---|---|---|---|
| | | Product 1 | Product 2 |
| 6 | 20-30 | 0/15 | 5/15 |
| | 10-15 | | 0/15 |
| 12 | 20-30 | 0/12 | 3/12 |
| | 10-15 | | 0/12 |
| 18 | 20-30 | 0/13 | 4/13 |
| | 10-15 | | 0/12 |

These results suggest that the sugar composition of the invention would be able to give rise to acceptable confectionery products. However, although the presence of solids such as chopped nuts in a product appears to mask the sugar crystals, it may be preferable to use finer crystals in a smooth nougat product.

The invention claimed is:

1. A frappe composition for use in the manufacture of foodstuffs, wherein the frappe composition comprises an aerated composition of a suspension comprising a sugar in glucose syrup, and coagulated protein, wherein the sugar is a milled sucrose and has a mean particle size of less than 30 microns, wherein the glucose syrup has a viscosity of from 6 Pa·s/60° C. to 1.5 Pa·s/60° C. and the ratio of glucose syrup to sugar in the composition is in the range of from 3:1 to 1:3, wherein the protein is present in the composition in an amount of from 2-20% w/w, and wherein the suspension is formed by a process step comprising adding and mixing the sugar with the glucose syrup at a temperature in the range of from 35° C. to no more than 65° C.

2. The frappe composition of claim 1, wherein the suspension consists of the sugar having a mean particle size of less than 25 microns and glucose syrup.

3. The frappe composition of claim 1, wherein the sugar is a refined sucrose.

4. The frappe composition of claim 1, wherein the sugar has a mean particle size of 5-25 microns.

5. The frappe composition of claim 1, wherein the sugar has a mean particle size of 10-15 microns.

6. The frappe composition of claim 5, wherein the frappe composition does not exhibit graininess or roughness due to the presence of the sugar in the frappe composition.

7. The frappe composition of claim 1, wherein the glucose syrup has a DE value in the range of from 35-95.

8. The frappe composition of claim 1, wherein the suspension is not a concentrated sugar syrup.

9. The frappe composition of claim 1, wherein the ratio of glucose syrup to sugar in the composition is in the range of from 2:1 to 1:2.

10. The frappe composition of claim 1, wherein the ratio of glucose syrup to sugar in the composition is in the range of from 1:1 to 1:1.5.

11. The frappe composition of claim 1, wherein the protein comprises powdered egg, milk protein, or a mixture thereof.

12. The frappe composition of claim 1, wherein the protein is present in the composition in an amount of from 5-15% w/w.

13. A frappe composition for use in the manufacture of foodstuffs, wherein the frappe composition comprises an aerated composition of a suspension of a sugar in glucose syrup, and coagulated protein, wherein the sugar is a milled sucrose and has a mean particle size of from 10-15 microns, wherein the glucose syrup has a viscosity of from 6 Pa·s/60° C. to 1.5 Pa·s/60° C. and the ratio of glucose syrup to sugar in the composition is in the range of from 3:1 to 1:3, wherein the protein is present in the composition in an amount of from 2-20% w/w, wherein the frappe composition does not exhibit graininess or roughness due to the presence of the sugar in the frappe composition, and wherein the suspension is formed by a process step comprising adding and mixing the sugar with the glucose syrup at a temperature in the range of from 35° C. to no more than 65° C.

14. The frappe composition of claim 13, wherein the protein comprises powdered egg, milk protein, or a mixture thereof.

15. A frappe composition for use in the manufacture of foodstuffs, wherein the frappe composition comprises an aerated composition of a suspension comprising a sugar that is a milled sucrose having a mean particle size of less than 30 microns in glucose syrup, and coagulated protein, wherein the suspension is formed in a process comprising:
   a) adding and mixing the sugar with the glucose syrup at a temperature in the range of from 35° C. to 45° C. to form a pre-mix; and
   b) heating the pre-mix at a temperature in the range of from 55° C. to no more than 65° C., thereby blending the sugar in the glucose syrup to form a suspension;
   wherein the glucose syrup has a viscosity of from 6 Pa·s/60° C. to 1.5 Pa·s/60° C. and the ratio of glucose syrup to sugar in the composition is in the range of from 3:1 to 1:3; and
   wherein the protein is present in the composition in an amount of from 2-20% w/w.

16. The frappe composition of claim 15, wherein the sugar is a refined sucrose.

17. The frappe composition of claim 15, wherein the sugar has a mean particle size of 5-25 microns.

\* \* \* \* \*